(12) United States Patent
Li et al.

(10) Patent No.: US 6,259,080 B1
(45) Date of Patent: Jul. 10, 2001

(54) AUTOFOCUS DEVICE FOR MICROSCOPE

(75) Inventors: Zheng Li, Hachioji; Takashi Yoneyama, Sagamihara; Tatsuki Yamada, Hachioji; Takashi Nagano, Tokyo, all of (JP)

(73) Assignee: Olympus Optical Co. Ltd., Tokyo (JP)

( * ) Notice: Subject to any disclaimer, the term of this patent is extended or adjusted under 35 U.S.C. 154(b) by 0 days.

(21) Appl. No.: 09/268,587

(22) Filed: Mar. 15, 1999

(30) Foreign Application Priority Data

Mar. 18, 1998 (JP) .................................................. 10-068398
Mar. 20, 1998 (JP) .................................................. 10-072558

(51) Int. Cl.$^7$ .............................. G02B 7/04; G02B 27/64
(52) U.S. Cl. .................................... 250/201.3; 250/201.2; 359/383
(58) Field of Search ........................... 250/201.2, 201.3, 250/201.4, 201.7; 359/368, 369, 379, 380, 383; 396/102, 121, 123

(56) References Cited

U.S. PATENT DOCUMENTS 5,714,749 * 2/1998 Yonezawa et al. ................ 250/201.3
5,886,813 * 3/1999 Nagasawa .......................... 250/201.3

FOREIGN PATENT DOCUMENTS

| 54-45127 | 4/1979 | (JP) . |
| 59-154880 | 9/1984 | (JP) . |
| 5-313071 | 11/1993 | (JP) . |
| 9-189850 | 7/1997 | (JP) . |

\* cited by examiner

*Primary Examiner*—John R. Lee
*Assistant Examiner*—Kevin Pyo
(74) *Attorney, Agent, or Firm*—Frishauf, Holtz, Goodman, Langer & Chick, P.C.

(57) ABSTRACT

The present invention is an automatic focal point detection device. In a broad visual field and high resolution observation, when focusing is impossible in a splitting visual field obtained by splitting a specimen in a visual field in plural number, a stage is moved to an in-focus position stored in advance and focusing is executed. Besides the device is provided with an excitation light shutter for intercepting an excitation light with which a specimen is irradiated and when stray light corresponding to a difference detected by closing and opening the shutter in fluorescence observation is smaller than a specific value, specimen search is performed and focusing is executed at a level exceeding stray light, while the difference is equal to or larger than the specific value, focusing is executed with nothing more done.

10 Claims, 11 Drawing Sheets

AUTOFOCUS DEVICE FOR MICROSCOPE

BACKGROUND OF THE INVENTION

The present invention relates to an autofocus device for a microscope which detects a focal point on a specimen and automatically effects focusing when high resolution observation or fluorescence observation is conducted.

An autofocus (AF) technique has in recent years been adopted so that optimal focus can be realized in a simple manner when a specimen is observed by a microscope. As a device for autofocusing, various techniques have been proposed and of the techniques, a so-called passive method is named in which focusing is effected based on a degree of blurring of an obtained observation image which is viewed (an image including a specimen in a visual field).

For example, a technique according to the Jpn. Pat. Appln. KOKAI Publication No. 9-189850 is that beams are irradiated to a specimen and two optical images of the specimen are formed with transmitted beams in different planes respectively displaced forward and backward relative to an estimated focal plane, contrast levels of the two optical images are obtained, a correct focal position on the specimen is determined through comparison between the contrast levels and then either an objective or a stage on which the specimen is placed is moved to assume an in-focus position and focusing is automatically effected for observation. When a picture is taken, an exposure time is calculated based on a light intensity from the specimen optical image present in an in-focus position and the specimen optical image is shot.

In specimen observation by a microscope, high resolution is first of all required and observation of an image formed by emitted fluorescent light from a specimen has had an increasing chance to be used as an inspection method whose information obtained is rich in volume.

When specimen observation is conducted by a microscope, a scope to be observed in the same visual field at a time is mainly determined by the magnifying power of an objective. In addition, a scope in which an image pick-up device which is mounted on the microscope can take a picture is limited to the visual field.

Generally, in order to obtain an observation image with high resolution, an objective with a high NA and a high magnifying power is mounted, but at that time a visual field is reduced to a very small part of a specimen. With an ordinary microscope, it has been impossible to observe the entire specimen or obtain an image thereof with a broad visual field and high resolution in the same visual field.

On the other hand, for example, a technique whereby an image with a broad visual field and high. resolution are realized is proposed by Jpn. Pat. Appln. KOKAI Publication No. 5-313071.

In this technique, as shown in FIG. 11, a desired visual field is split into a plurality of small areal images, input information is obtained from each small areal image and when the image of a specimen is displayed or printed, the entire visual field is reconstructed as one image and thereby an image of the entire specimen with a broad visual field and high resolution can be achieved.

A problem described below arises when a conventional autofocus technique is adopted as it is in this technique.

In this case, when a desired visual field for observation and shooting is slit into a plurality of small areal images and the shooting is then performed, the shooting is continuously conducted while autofocusing is performed for each small area obtained by the splitting.

That is, as shown in FIG. 11, an observation image is split into nine areas of from X1Y1 to X9Y9 and in shooting, autofocusing is performed for each small areal image.

In this case, since sufficient contrast levels are available in areas other than X2Y2 and X3Y3, autofocusing can be performed there, but no autofocusing can be performed in the small areal images X2Y2, X2Y2 since no specimen is available in the small areal image of X2Y2 and a contrast of a specimen is low in the small area image of X3Y3, whereby differences in contrast level of the specimen cannot be obtained there.

Accordingly, a series of shooting of plural images cannot be continued and as a result, an image with high resolution covering the entire specimen is impossible to be attained.

Fluorescence observation is a method in which irradiation with excitation light to a specimen is effected which has been treated by fluorescent dye and an image formed by emission of weak fluorescent light from the specimen is observed.

One of features the fluorescence observation is fading. Fading of a specimen is to show over-time attenuation of fluorescent light power emitted from the specimen which is caused by irradiation with excitation light on the specimen treated by fluorescent dye.

The attenuation of the light is proportional to an intensity of excitation light×a irradiation time of the excitation light. Hence, an operator has to adjust the irradiation time so as to be as short as possible.

However, in order to alleviate a burden on specimen observation, in fluorescence observation, too, a demand for mounting an autofocus device on a microscope has progressively been strengthened.

An autofocus device for fluorescence observation requires the following capabilities:

1) a sensor which detects an observation image has to be of high sensitivity since fluorescent light emitted from a specimen is weak;
2) a speed for achieving focus has to be high (a time required for achieving focus is short) since a time over which a specimen emits fluorescent light is short due to a fading effect; and
3) high accuracy in focusing is required in order to raise reliability in inspection.

For example, a method is disclosed in Jpn. Pat. Appln. KOKAI Publication No. 54-45127, in which an integral time of an integrating light receiving element in use for detecting an observation image is controlled according to brightness of the observation image and an apparent sensitivity is thus improved.

Besides, another method is disclosed in Jpn. Pat. Appln. KOKAI Publication No. 59-154880, in which light shielding pixels or a shutter in a forward position of the shutter is used for a purpose of intake of a light image from an observation image with good accuracy and thereby noise light is removed.

In an ordinary microscope, however, environmental irradiation light and the like is mixed into an light image formed on a sensor by incident light through an objective in addition to an optical image from an observation image, that is stray light is mixed. Hence, an microscope in which a conventional autofocusing technique as it is adopted cannot be applied to fluorescence observation.

At this point, stray light will be described.

FIG. 12 is a representation showing details of optical paths of a microscope used in fluorescence observation.

Essentially, optical paths of a microscope are as follows: incident light emitted from a light source 52 of a mercury lamp and the like shown a solid line passes through a downward projection fluorescent tube 54, a specimen is irradiated with the light and a fluorescent image of a specimen S is sent to an image sensor 59 through an objective 56 as information.

However, image light which is actually supplied as input to the image sensor 59 includes light which is strayed into the image light from a different path from the normal paths.

As one example for the case, stray light is shown by a path of a broken line A in the figure. When a microscope resides in a room, irradiation light such as from fluorescent lamp is supplied into the image sensor 59 as stray light.

That is, irradiation light in the room is reflected on a stage 51 and a slide glass for the specimen S and then passes through the objective 56 to be projected on the image sensor as input. As another source of stray light, the irradiation light domes into the image sensor 59 through eyepieces 57.

Such stray light is weaker in intensity than fluorescent light from the specimen, but an autofocus device for a microscope works in a wrong manner in connection with a threshold value which is a base by a cause of the stray light as shown by the broken lines A and B in the figure since output of fluorescent light from the specimen is essentially weak. In addition, when an observation image is blurred in fluorescence observation, an observation image which is an input to the image sensor cannot be distinguished from the stray light.

When an autofocus device disclosed in Jpn. Pat. Appln. KOKAI Publication No. 54-45127 is applied to fluorescence observation, since an integral time of a sensor is adjusted in a condition where the stray light is incorporated in the course of specimen search, the integral time gets longer and amounts to a value larger than a time actually required for intake of a specimen image, which entails great reduction in a focusing speed.

In Jpn. Pat. Appln. KOKAI Publication No. 59-154880, if light shielding pixels or a shutter in a forward position of a sensor is used, removal of stray light coming through an objective is impossible as in the case of a normal specimen optical. image. Besides, since stray light is different in nature or quantity according to environmental conditions surrounding a microscope or capabilities of the microscope, stray light is hard to be removed from light including image light in advance.

BRIEF SUMMARY OF THE INVENTION

The present invention has an object to provide an automatic focal point detection device for a microscope, which is mounted on the microscope, which performs autofocusing at a designated position when focusing in one of a plurality of small areal images on a specimen in a visual field obtained by splitting the specimen is impossible in broad and high resolution observation, and by which focusing on the specimen in fluorescence observation is realized with a high speed and high accuracy.

A automatic focal point detection device for a microscope of the present invention reads in-focus position information on a small areal image which has achieved focus for the first time, which has been memorized in advance, when focusing in. one of a plurality of small areal images on a specimen in a visual field obtained by splitting the specimen is impossible in broad and high resolution observation, or alternatively in-focus position information on a small areal image which achieved focus in the previous time, which is constantly rewritten; moves the stage to a stage position according to the in-focus position information to effect focusing there; thereafter shooting is repeated on other small areal images sequentially while focusing; and then small areal images which have been shot are integrated so as to reconstruct the entire specimen image.

A automatic focal point detection device for a microscope of the present invention is a device which comprises an excitation light shutter for intercepting excitation light, which is irradiated on a specimen, in a forward position of a light source for excitation light off an optical path of an image forming optical system, in other words away from an optical path leading to eyepieces from an objective or to an integrating image sensor, the excitation light shutter being put in an interlocking relation with a focusing mechanism, and in which a predetermined reference level and a difference output from a stray light difference output means are compared with each other and when the difference output is larger, focusing is conducted, while when the difference output is smaller, an integral time of an integrating image sensor is set to one of values set in advance according to kinds of objectives mounted and after the focusing mechanism is driven to attain a position where a difference output exceeds a stray light signal level, the integral time is restored to its original value and then focusing is conducted.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Below, embodiments of the present invention will be detailed with reference to the drawings.

Figure 1:
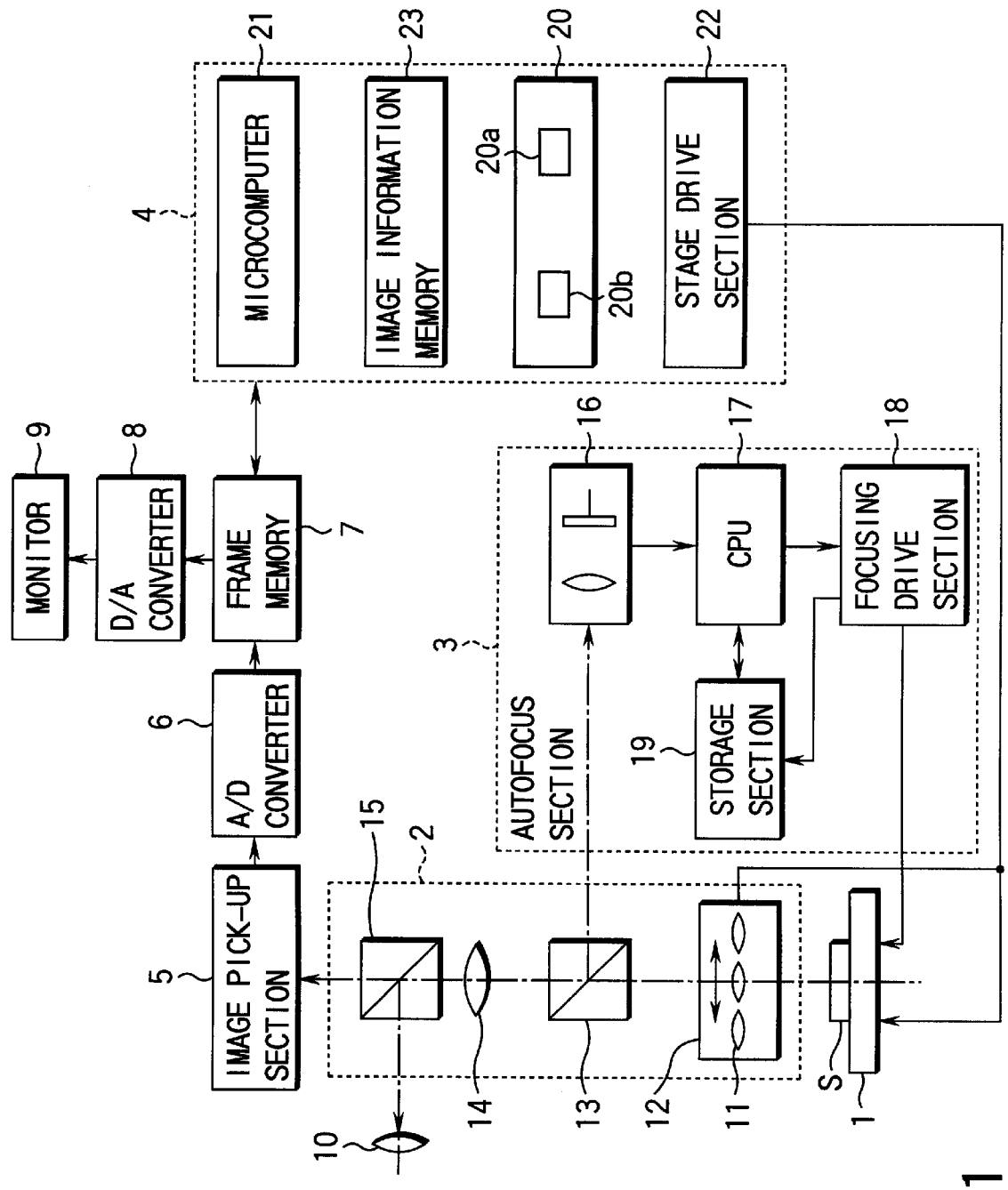
FIG. 1 is a block diagram showing a schematic construction of a microscope according to a first embodiment of the present invention.

FIG. 1 shows a schematic construction of an autofocus device which is mounted on a microscope whereby an observation image (an image including a specimen in a visual field) with high resolution is obtained, and which conducts autofocusing on the observation image as the first embodiment.

The microscope comprises: a scanning stage (hereinafter referred to as stage) 1 on which a specimen S is placed, and which can three-dimensionally be moved; an image forming optical section 2 for forming an optical image of the specimen S; an autofocus section 3 which achieves focus based on a contrast level difference while giving an optical path difference to an optical image; an image pick-up section 5 for shooting an observation image; an A/D converter 6 which converts shot observation image data into a digitized form; a frame memory 7 which holds image data temporarily; an image processing section 4 for integrating small areal images read from the frame memory 7 using a program; a D/A converter 8 which converts read digitized image data into an analogue form; a monitor 9 for displaying the observation image; and eyepieces 10 for observing with the naked eye by an operator.

The image forming optical section 2 comprises: a revolver 12 with a plurality of objectives 11 which are different from one another in magnifying power, and each of which collects irradiation light transmitted through a specimen S; a first prism 13 which splits a collected optical image into for observation and for autofocusing; an image forming lens 14 for collecting an observation image; and a second prism 15 which splits light which is transmitted through the image forming lens 14 so as to be irradiated to the eyepieces 14 and the image pick-up section 5.

The autofocus section 3 comprises: a sensor section 16; a CPU 17; focusing drive section 18; and a storage section 19.

The sensor section 16 in which an optical path difference is given to an optical image irradiated from the image forming section 2 after the splitting, for example providing different planes respectively displaced forward and backward relative to an estimated focal plane and contrast level differences of two optical images are detected. The CPU 17 calculates a direction and an amount of focal shift of the specimen (from an in-focus position of the specimen) and instructs the drive section. The focusing drive section 18 moves the stage to an in-focus potion obtained by a stage drive signal which is supplied by the CPU 17 as output. The storage section 19 stores the in-focus position which has been obtained by the CPU 17.

The CPU 17 compares the difference in contrast level detected by the sensor section 16 with a set value which has been set in advance on condition that execution of autofocusing is enabling and judges whether or not autofocusing is executed.

When the specimen is positioned so that an incident optical image which is split from the image forming optical section 2 can be applied to autofocusing, the CPU 17 calculates a direction and an amount of focal shift of the specimen, that is an in-focus position of an observation image, based on a contrast level difference of the optical image of the specimen.

Then, the CPU 17 controls the focusing drive section 18 with a stage drive signal to move the stage 1 to the in-focus position along an optical axis direction (an optical axis direction of the objective) and thus autofocusing is effected.

The in-focus potion is written in the storage section 19 as three dimensional data from the CPU 17. Three dimensional data of the small areal image is to show an optical axis position of an ordinary objective, that is an optical axis position of an objective used for observing a small areal image, in X-Y coordinates with a middle point of the stage face as an origin and to show a distance from the stage face to the objective in a Z coordinate. The in-focus position is stored as a Z coordinate.

On the other hand, when it is judged in the CPU 17 that autofocusing cannot be executed since no optical image of a specimen is available in a small areal image or a contrast of the optical image is low, whereby a contrast level detected by the sensor section 16 is smaller than a predetermined setting value, the CPU 17 reads an in-focus position signal which has already been stored in the storage section 19. The CPU 17 controls the autofocusing drive section 18 based on the in-focus position signal so as to move the stage 1 to the in-focus position.

Not only does the CPU 17 calculate an in-focus position of a specimen, but can also calculate a required exposure time for shooting of the specimen according to a signal from the sensor section 16, and a calculation result is sent to the image pick-up section 5 from the CPU 17 and the image pick-up section 5 performs shooting of an observation image at this exposure time.

Data of the observation image (a small areal image) picked up by the image pick-up section 5 is converted into a digitized form by the A/D converter 6 and stored in the frame memory 7. The digitized image data stored in the frame memory 7 is converted into an analogue form by the D/A converter 8 to display the observation image on the monitor 9. In this embodiment, the frame memory 7 can record small areal images picked up in the image pick-up section 5 and an image covering the visual field which has been reconstructed by the image processing section 4, described later, and the monitor 9 can present any type of the images.

The image processing section 4 comprises: an operator section 20 including a release switch 20a for shooting a specimen and a setting section 20b for setting the number of small areas to be obtained by splitting of the specimen and actually determining small areas on the specimen; a microcomputer 21 for controlling constituent sections of this embodiment such as movement of the stage 1 and the like; a stage drive section 22 for two-dimensionally moving the stage 1 in a plane perpendicular to the optical axis under control of the microcomputer 21; and an image information memory 23 which can store a plurality of pages of digitized image data which have been read from the frame memory 7.

When the number of small areas to be obtained by the splitting of the specimen is set by a setting section 20b of the operator section, the microcomputer 21 sends out to the focusing drive section 18 a two-dimensional signal as shown below in order to move the stage 1 and counts the number of shooting of small areas based on the set splitting number:

$\{(X1,Y1),(X2,Y2) \ldots (Xn,Xn)\}$.

The focusing section 18 moves the stage 1 so as to make a visual field to be a small area of the specimen in a plane (an X-Y plane) perpendicular to the optical axis based on such a two-dimensional signal. After the movement of the stage 1 to a position so as to achieve the desired visual field, observation and shooting are performed and a result is presented on the monitor 9.

Workings of a microscope according to this embodiment will be described with reference to the flow chart shown in FIG. 2.

First of all, an objective 11 is selected and the microscope is adjusted through a framing operation so as to position a specimen (a central portion thereof) for observation or shooting to assume its position in the central portion of the visual field of the microscope (step S1).

Then, the splitting number of the visual field (which is the number of splitting number of the specimen) is set by the setting section 20b (step S2). With the setting, the number N of shooting is determined to be the same number as the splitting number (step S3). Thereafter, the release switch 20a is pushed in (step S4) and the shooting of small areas of the specimen gets started.

At this point, autofocusing is performed on part of the specimen which is in the central portion of the visual field (step S5) and the in-focus position (a distance from the specimen to the objective lens 11, is recorded in the storage section 19 (step S6).

Then it is judged whether or not the number of shooting has reached N (step S7). When the number of shooting has reached N in this judgment and shooting of all the small areal images has been completed, which means N=0 (YES), a series of operations are terminated. However, when the number of shooting has not reached N (NO), shooting is repeated,.the stage drive section 22 moves the stage 1 in a plane perpendicular to the optical axis by a two-dimensional signal from the microcomputer 21 and an small area X1Y1 is moved into the visual field (step S8).

Then autofocusing is performed on the small area X1Y1 (step S9) and it is judged whether or not an in-focus position is obtainable (step S10).

With this judgment, when autofocusing is enabling and the small area is set in an in-focus position (YES), the image pick-up section 5 shoots the small area (X1Y1) (step S9). However, when it is judged by the CPU 17 that autofocusing cannot be effected since there is not any optical image of the specimen in the small area X1Y1 or a contrast of an optical image is low (NO), an in-focus position signal which has already been recorded in the storage section 19 is read and the stage 1 is moved to an in-focus position along the optical axis (Z axis) by the focusing drive section 18 (step S12). After completion of the movement, program flow goes to the step S11 and there, the image pick-up section 5 shoots in the visual field of the small areal image.

After completion of such shooting, a series of shot image data are converted into a digitized form by the A/D converter 6 and a result is subsequently stored in the frame memory 7 temporarily.

Then, the number of shooting is incremented for a purpose of counting to assume N−1(step S13) and thereafter program flow returns to step S7.

Thereafter, and till a termination condition is established, the processing from the step S5 to step S12 is repeated and all the images of splitting small areal images are shot. Small areal images which have been shot are sequentially stored in the image information memory 23 through the frame memory 7 and an integration of macro images including image processing is executed by a software to form an observation image with a broad visual field and high resolution. The observation image is displayed on the monitor 9 through the frame memory 7 and the D/A converter 6.

In order to display an image in a selective manner, the operator section 20 is provided with a button section 20c, by which input of a figure can be effected. With operation in the button section 20c, a plurality of images can be displayed in an overlapped manner or in an in-parallel arranged manner as a picture-in-picture image on the screen of the monitor 9.

For example, when the 2 key is pushed down and the numeric value 2 is entered as input, a small areal image which is stored in the image information memory 23 in the second place is fetched through the memory controller 25 and the image is displayed on the monitor 9 through the memory controller 25, the frame memory 7 and the D/A converter 8.

When the 0 key is pushed down and the numeric value 0 is entered as input, the entire image which has been subjected to image processing is read out through the memory controller 25 and the entire image is displayed on the monitor 9 as described above. When an input like [2,0] is entered, a small area image which is stored in the image information memory 23 in the second place and the entire image which is also stored there are simultaneously displayed on the monitor 9.

According to the first embodiment, when shooting or observation is effected on a specimen which is to be observed which is split into smaller areal images into a plural number, since a table is moved to a position where focus is achieved and autofocusing is performed there regardless of whether or not a specimen in a small areal image which is obtained by splitting is present or distribution of the specimen in the small areal image, an in-focus observation image with a broad visual field and high resolution can be attained through integration of the shot images by a software.

In a modified example of this embodiment, the first in-focus position in a series of shooting is not recorded in the storage section 19 and instead, each time when autofocusing is performed (when focus is achieved), the previous (latest) in-focus position which is stored in the storage section 19 is updated to record a new in-focus position.

Figure 2:
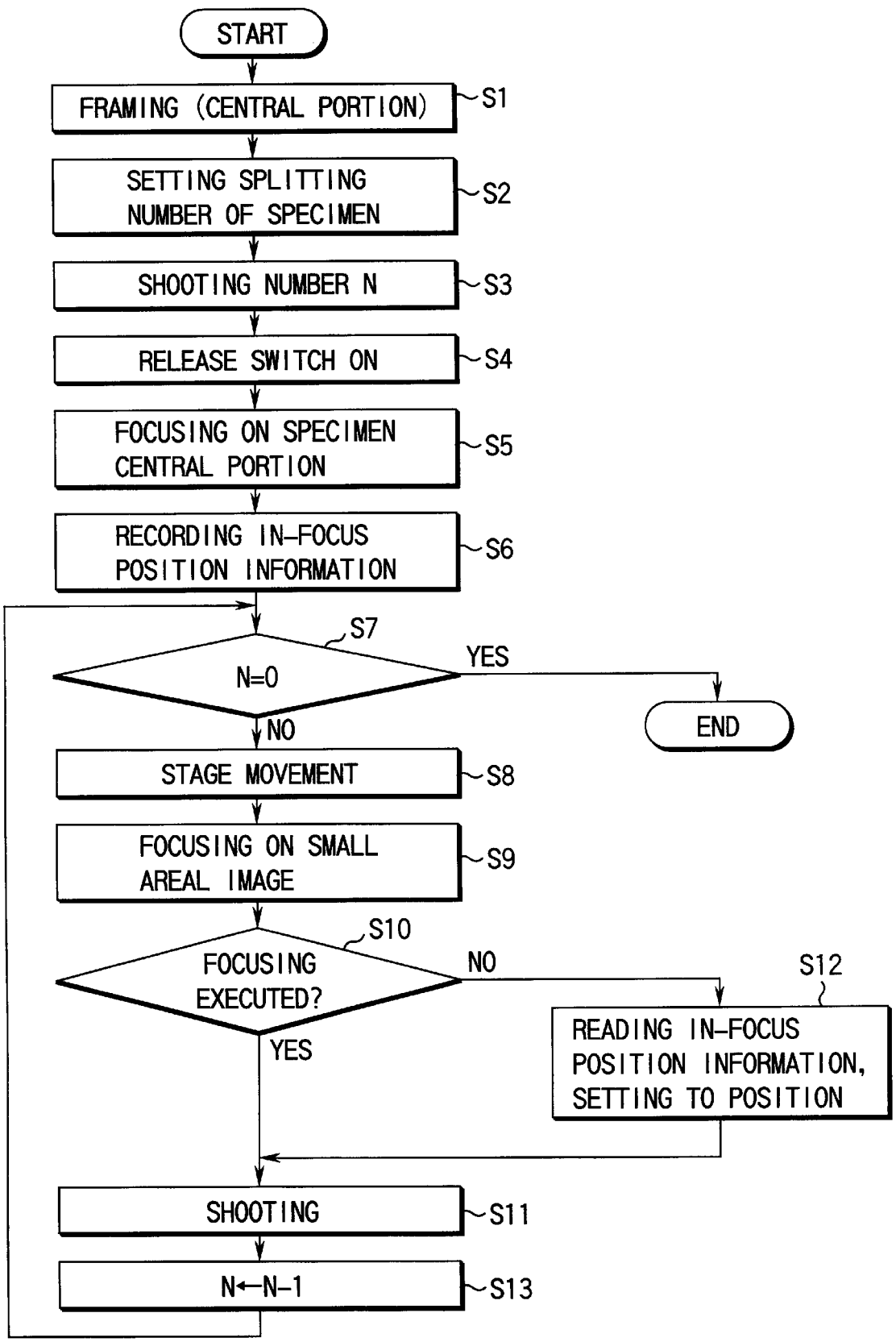
FIG. 2 is a flow chart for illustrating actions of the microscope in the first embodiment.
Figure 3:
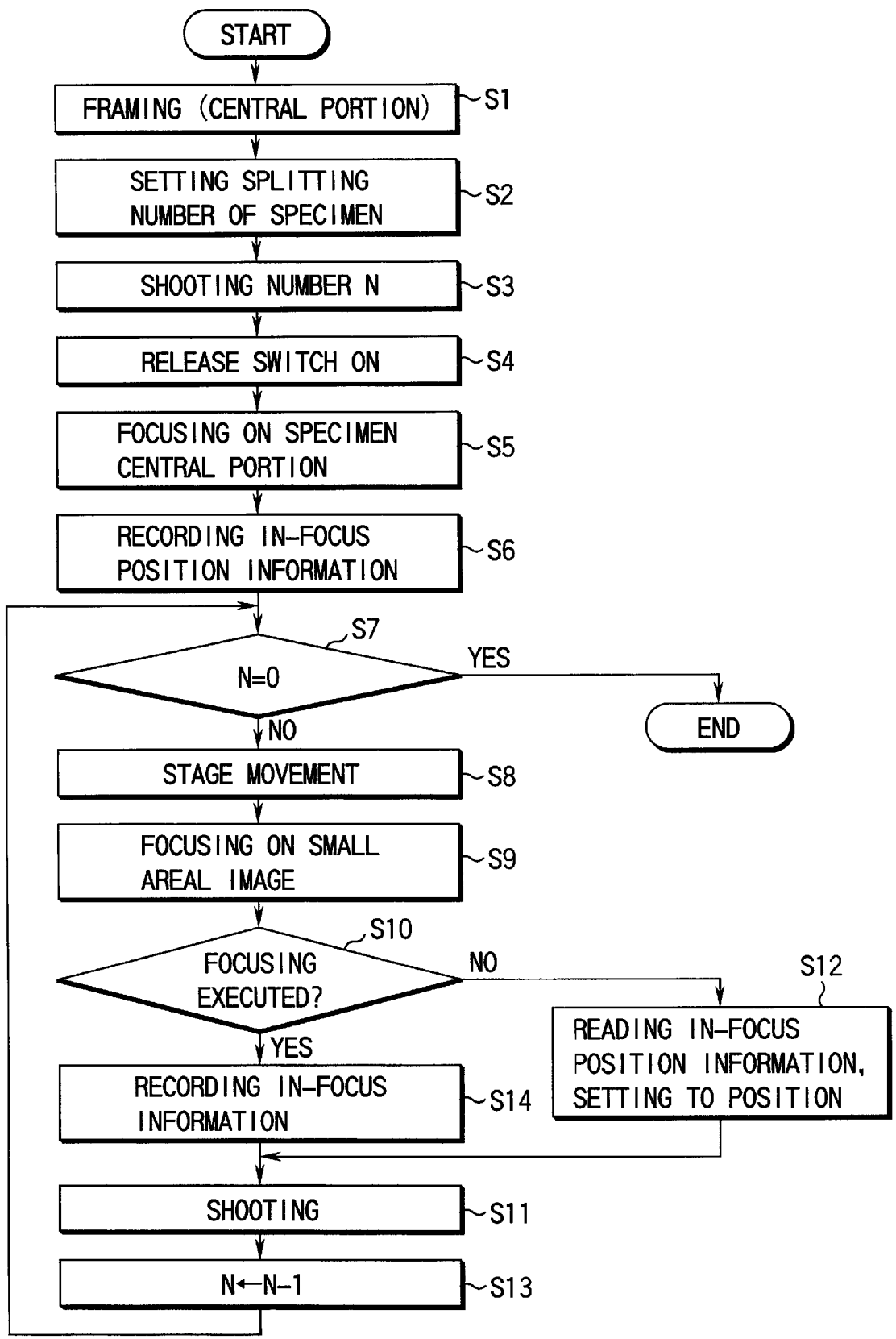
FIG. 3 is a flow chart for illustrating modified actions of the microscope in the first embodiment.

The action is reflected by inserting step S14 shown in FIG. 3 in which recording of in-focus information is performed directly after step S10 shown in FIG. 2.

With such an action effected, when focus cannot be achieved by autofocusing, the previous time in-focus position is adopted and the stage 1 is moved by the focusing drive section 18. In this case, since in addition to the effect attained in the action of FIG. 2 the stage 1 is moved to the previous time in-focus position which has been shot just before autofocusing comes to be disabled, a movement distance is reduced and thereby shooting of small areal images can all be finished in a short time with efficiency.

Besides, in this embodiment, a first shooting area may, instead of the middle portion of the visual field, be selected in any arbitrary area in which autofocusing can be effected and shooting is performed, and the in-focus position may be utilized so as to be recorded in the storage section.

Figure 4:
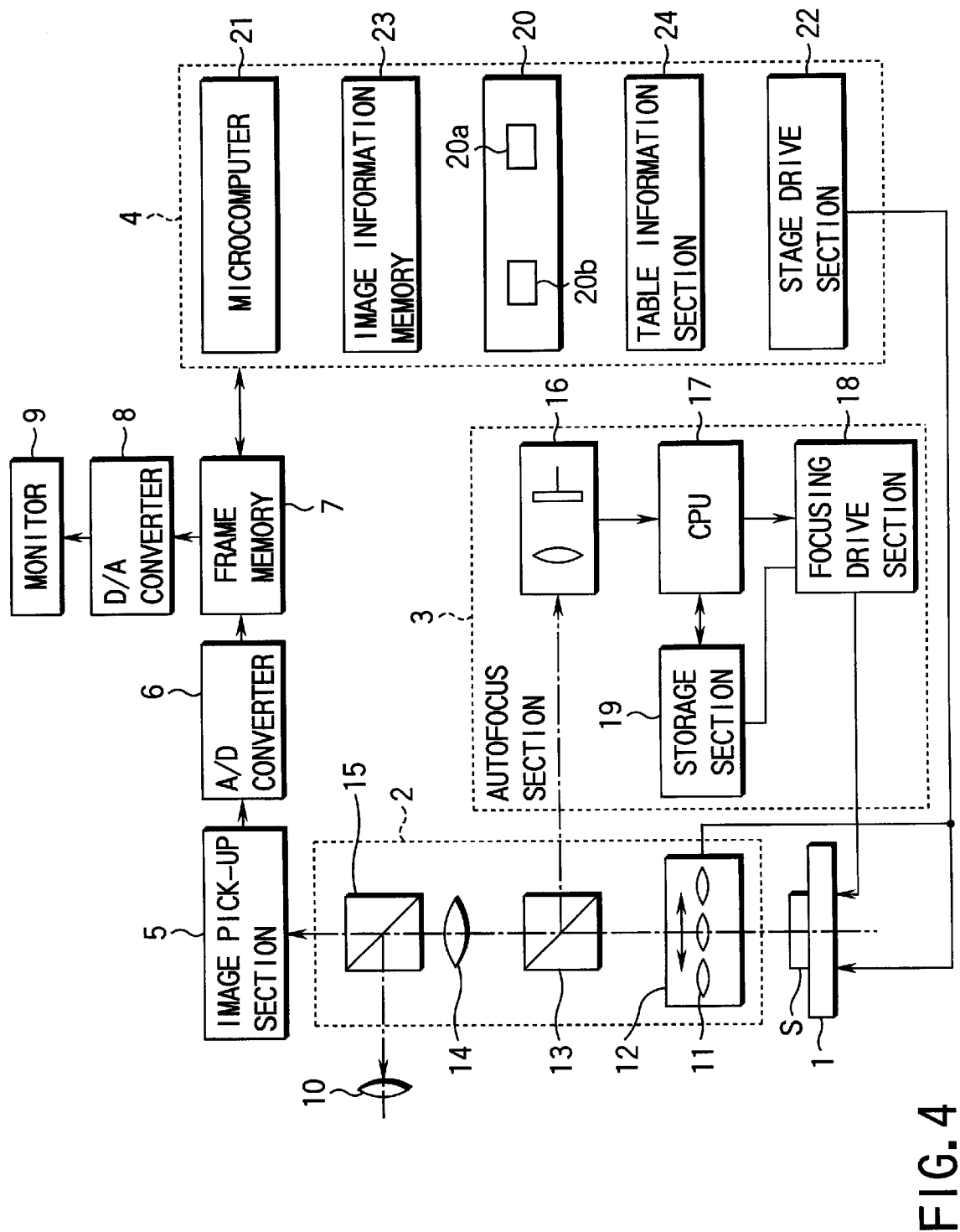
FIG. 4 is a block diagram showing a schematic construction of a microscope according to a second embodiment of the present invention.

In FIG. 4, a schematic construction of a microscope according to the second embodiment of the present invention is shown and this embodiment will be described below. In this embodiment, the equal constituents to those in the first embodiment are respectively indicated by the same reference marks and description on the equal constituents is omitted.

This embodiment is constituted so that the splitting number of a specimen is determined by a magnification power of an objective selected in the setting section 20b.

In order to perform shooting so that the entire image of the specimen can be accommodated in the visual field, first of all, shooting is performed selecting an objective with a low magnifying power and thereafter, a high resolution lens is selected to substitute for the objective with a low magnifying power for a purpose of shooting of small areal images (macroimages). At this point, the splitting numbers corresponding to lenses from an objective with a low magnifying power to an objective with a high magnifying power are in advance recorded in a table information section 24a in a memory of the microcomputer 21 as table information, as described below.

TABLE 1

| | High Magnitude Objective Lens for Macro Image (Magnification) | | | | | | |
|---|---|---|---|---|---|---|---|
| | 2 | 4 | 10 | 20 | 40 | 60 | 100 |
| Low Magnitude Objective Lens for Entire Image (Magnification) 1.25 | 2 × 2 | 4 × 4 | 8 × 8 | 16 × 16 | | | |
| 2 | — | 2 × 2 | 5 × 5 | 10 × 10 | | | |
| 4 | — | — | 3 × 3 | 5 × 5 | 10 × 10 | | |

Here, when shooting is performed on the entire image of the specimen with a 4×objective and then second shooting is performed on small areal images with a 40×objective, the specimen is split into 10×10, that is into 100 small areal images.

Along with the splitting, positional information of small areal images which is produced by the splitting are stored in a memory of the microcomputer 21 as three-dimensional data (coordinate data) for a table and in shooting, the positional information is sequentially read. The microcomputer 21 issues a control signal for driving the table drive section 2 in order to move the stage two-dimensionally based on the positional information and the stage 1 is horizontally moved.

When an objective is selected in the setting section 20b, the microcomputer 21 drives and controls the table drive section 22 and revolves the revolver 12 to make a selected objective inserted in an optical path of the microscope.

Figure 5:
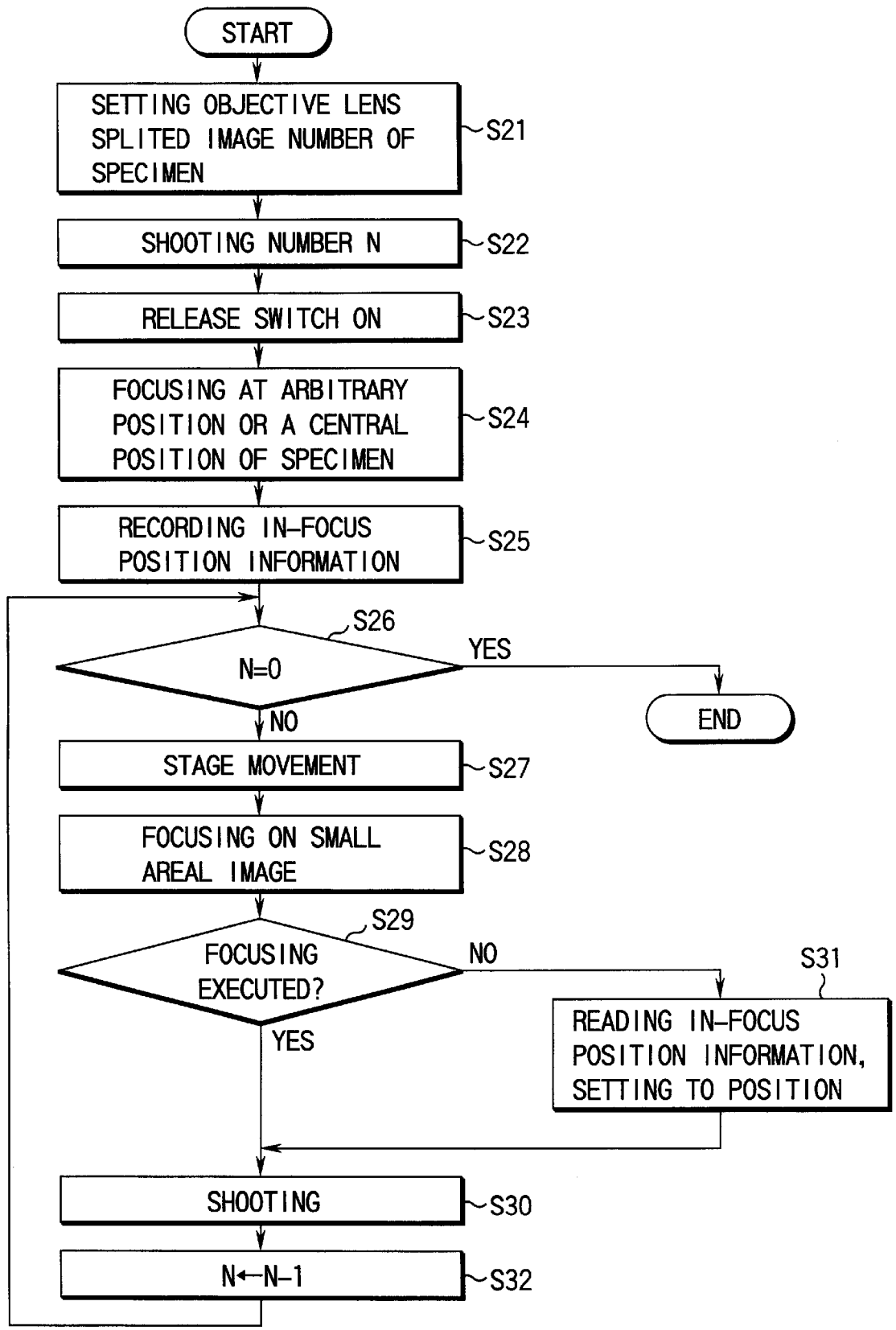
FIG. 5 is a flow chart for illustrating actions of the microscope in the second embodiment.

Workings of a microscope according to the second embodiment will be described with reference to a flow chart shown in FIG. 5.

First of all, a magnifying power of an objective for shooting the entire specimen and a magnifying power of an objective for shooting small areal images (macro image) of the specimen are set by the setting section 20b (step S21). On the setting, the splitting number of small areal images as shown in Table 1, that is the number N of shooting is determined based on table information stored in the table information section 24 (step S22).

Then, the release switch 20a is pushed in to start a series of image shooting (step S23). Firstly, the objective lens 11 in whose visual field the entire specimen is accommodated is mounted and autofocusing for the entire image of the specimen is performed (step S24) and further, information on the in-focus position which has been obtained in the autofocusing is stored in the storage section 19 (step S25). In this case, for example, focus is achieved at the central portion of the specimen. Needless to say that the focusing may be effected in a portion where a contrast difference of the specimen is large or may be effected in a portion which the operator desires as a target. At this point, the entire image of the specimen is shot in the image pick-up section 5 and information may be recorded in the image information memory 23.

Then it is judged whether or not the number of shooting is N=0, that is whether or not the shooting of all the small areal images of the specimen has been completed (step S26).

Figure 11:
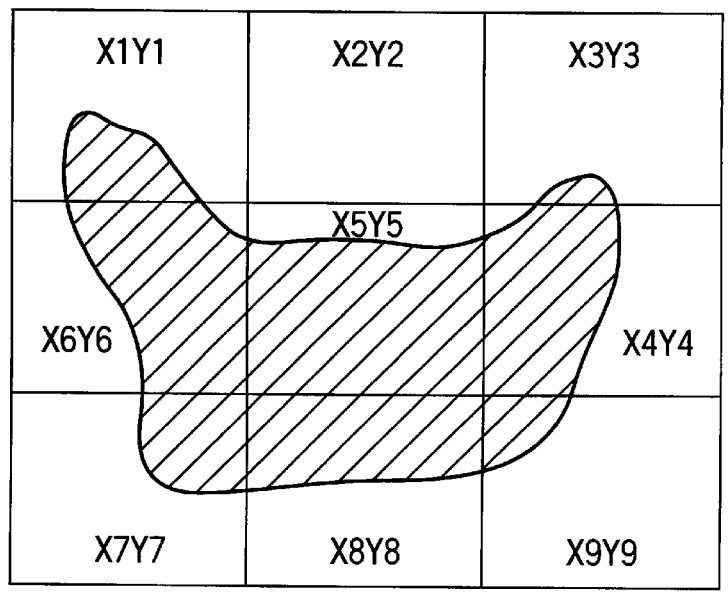
FIG. 11 is a representation showing an example in which a specimen is split into a plurality of small areal images in a conventional technique.
Figure 12:
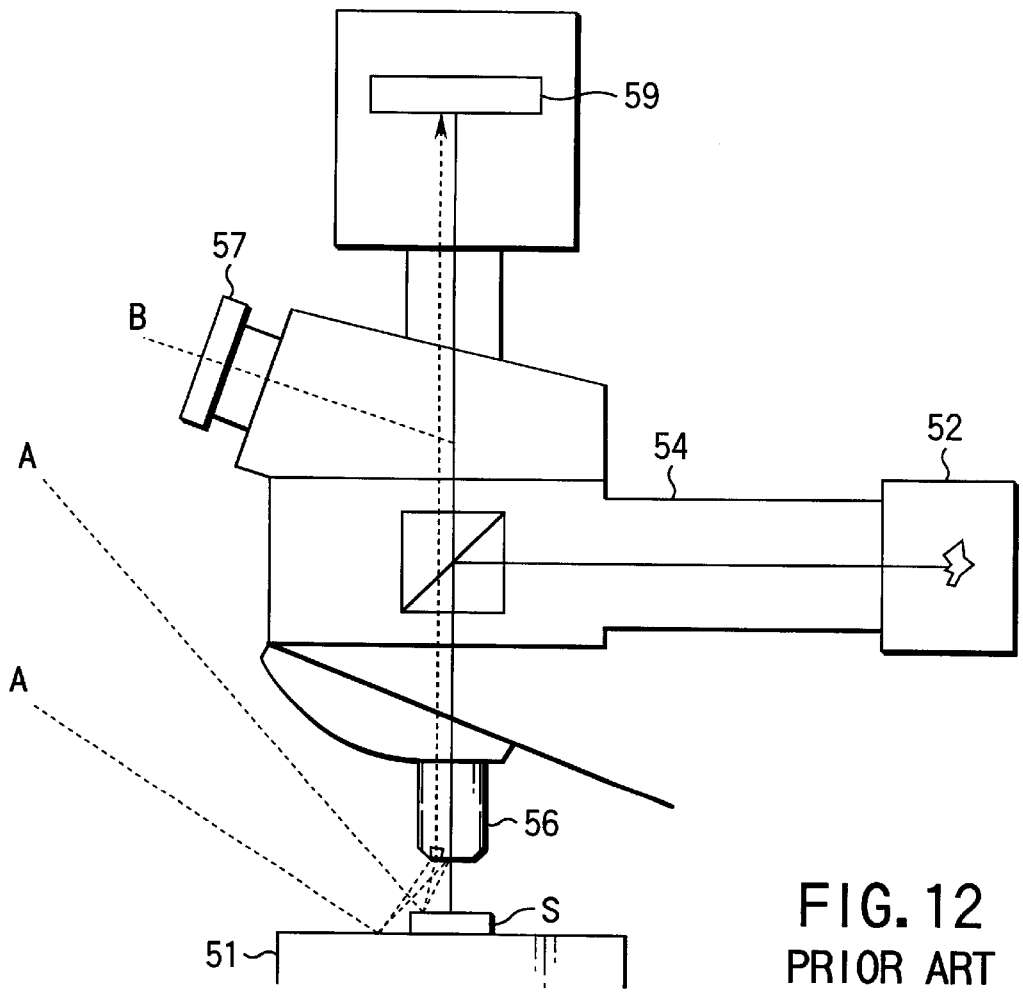
FIG. 12 is a representation showing optical paths in a microscope for illustrating stray light in a conventional technique.

In the judgment, when the shooting of all the small areal images has been completed (YES), a series of shooting actions are terminated. However, when the shooting has not yet been completed (No), the microcomputer 21 issues a control signal as output to the stage drive section 22 and the stage 1 is moved along a plane perpendicular to the optical axis so as to make the visual field for shooting to move to the next small areal image which has not been shot (step S27). Further description will be made with reference to FIG. 11.

In the first shooting, the stage 1 is moved so that shooting is effected in the visual field of the small areal image X1Y1. Then autofocusing is performed on the small areal image X1Y1 (step S28) and it is judged whether or not focus can be achieved (step S29). When the focus has been able to be achieved (YES), part of the specimen is shot in the visual field of the small areal image X1Y1 by the image pick-up section 5 (step S30).

However, in the step S29, when the CPU 17 has judged that focusing cannot be effected (NO) since there is not available an optical image of the specimen in the small areal image X1Y1 or a contrast of an optical image is low, an in-focus position when the entire specimen image is focused which has been recorded in the storage section 19 is read and the stage 1 is moved along the optical axis direction by the focusing drive section 18 (step S31).

Thereafter, in step S30, the image pick-up section 5 shoots a small areal image. Then, a series of image data shot by the image pick-up section 5 are sent out as output to the A/D converter 6 and the image data from the A/D converter 9 are further transferred to the frame memory. Then the number of shooting is decremented by subtracting by 1, program flow is returned to step S26, there autofocusing and shooting which is same as before are repeated till the shooting number comes to be 0, all the small areal images created by the splitting are shot and a series of actions is terminated.

In this embodiment, as described in the first embodiment, image data of small areal images are sequentially stored in the image information memory 23 through the frame memory 7, then image integration including image processing by a software is performed to effect reconstruction in which one observation image covering the entire specimen is obtained and the observation image with a broad visual field and high resolution is displayed on the monitor 9.

The entire image of the specimen which has been obtained through reconstruction or the entire image of the specimen which has been obtained through shooting using an objective with a low magnifying power is recorded together while establishing a specific relation to each other, whereby when the entire image of the specimen is displayed on the monitor 9 and one particular portion is clicked by operation in the operator section 20b, an enlarged image corresponding to a small areal image and positional information thereof can be displayed. Autofocusing in this embodiment has been a hill climbing method, but it is needless to say that there is no specific reason for limitation to this method. A common active method can also be employed with ease.

Then an automatic focal point detection device for a microscope according to the third embodiment will be described.

Figure 6:
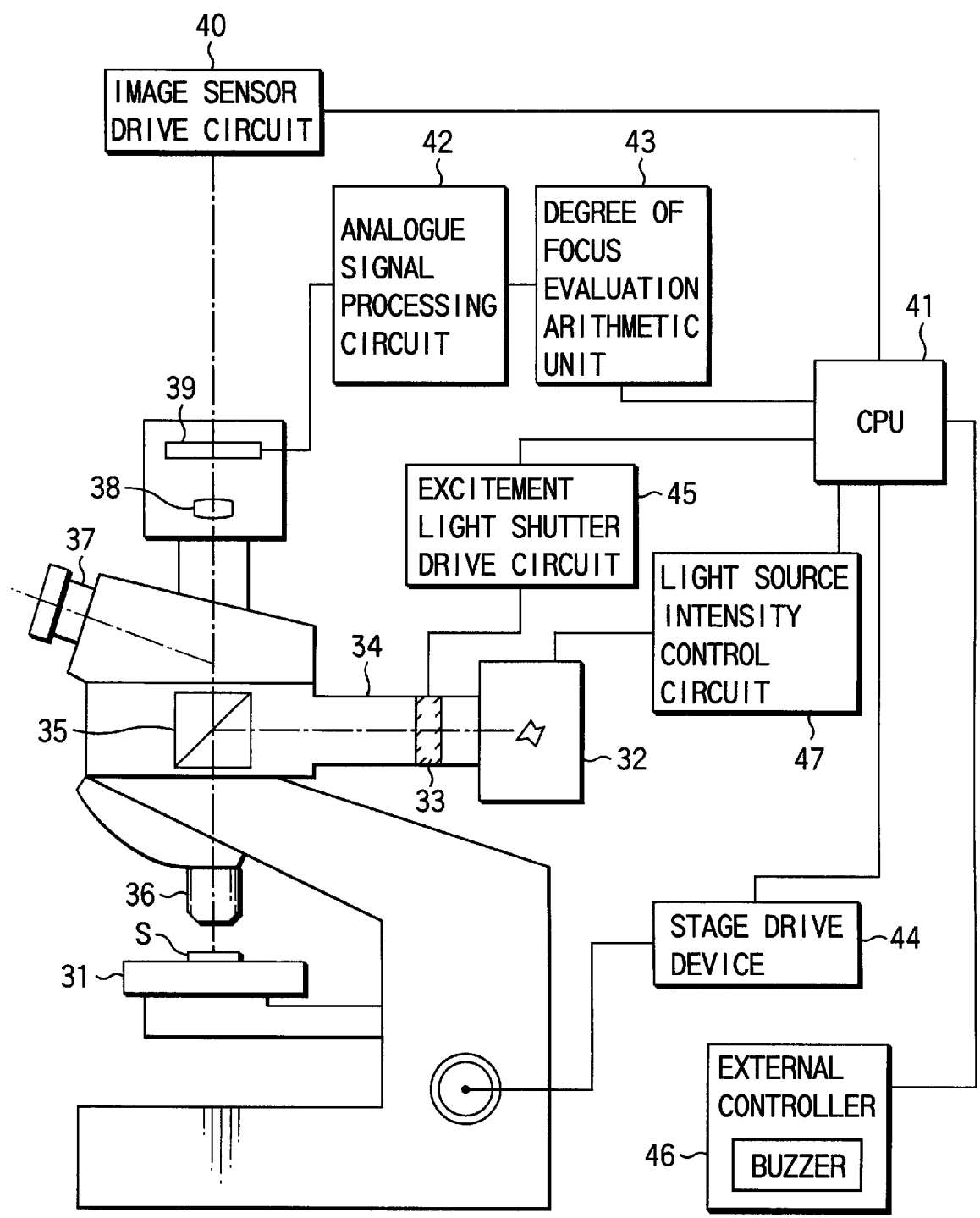
FIG. 6 is a block diagram showing a schematic construction of an automatic focal point detection device for a microscope with a schematic side view of the microscope according to a third embodiment.

In FIG. 6, an example of a schematic construction of an automatic focal point detection device mounted on a microscope. This embodiment is an automatic focal point detection device in which a malfunction caused by stray light on observation using fluorescent light is prevented from occurring and focusing on a specimen with a high speed and high accuracy is realized.

An optical system of this embodiment comprises: a stage 31 which can vertically move while holding a specimen thereon; a stage drive device 44 for achieving focus on a specimen S while vertically moving the stage 31; a light source of excitement light for irradiating the specimen therewith, for example a mercury lamp 32; an excitement light shutter 33 which enables interception control of the excitement light with which the specimen S is irradiated; a downward projection fluorescent tube 34 for guiding the excitement light with which the specimen is irradiated; a corner cube 35, with which the excitement light is refracted toward the objective 36 side, and through which a fluorescence image emitted from the specimen is transmitted; eye pieces 37 for use in observation by an operator of the fluorescence image emitted from the specimen after splitting the fluorescence image; an image forming lens 38 for the automatic focal point detection device used in autofocusing; an image sensor 39 for photoelectric conversion while receiving the fluorescence image which has been formed; an image sensor drive circuit 40 for sending out as output a drive pulse which determines timing for photoelectric conversion to the image sensor 39 under control by a CPU 41 so as to suit a dynamic range of an analogue processing circuit 42; the CPU 41 for controlling constituents; the analogue processing unit 42 for executing specific processing on an image signal from the image sensor 39; a degree of focus evaluation arithmetic unit 43 for operating and evaluating according to an operation expression which has been designated from the CPU 41; an excitation light shutter drive circuit 45 for opening or closing the excitation light shutter 33 under control of the CPU 41; an external controller 46; and a light source intensity control circuit 47 for adjusting output of the excitation light source.

In the optical system of this embodiment thus constructed, excitation light is emitted from the mercury lamp 32, and the excitation light passes through the excitation shutter 33, guided into the downward projection fluorescent tube 34, refracted by the corner cube 35, then passes through the objective 36 and finally is irradiated on the specimen S held on the stage 31.

A fluorescent image emitted from the specimen S passes through the objective 36, part of the image is observed by the operator through the eye pieces 37, while another part passes through the image forming lens 38 for the automatic focal point detection device which is used in focusing to form an image and the image is irradiated on the image sensor 39.

The image sensor drive circuit 40 constantly sends out as output drive signals to the image sensor 39 so as to suit the dynamic range of the analogue processing circuit 42 under control of the CPU 41 and the image sensor 39 performs photoelectric conversion on a received optical image at timings according the drive pulses as input.

An image signal which has been converted to an electric signal by the image sensor 39 receives specific processing in the analogue processing circuit 42 and sends to the degree of focus evaluation arithmetic unit 43.

The degree of focus evaluation arithmetic unit 43 conducts operation and evaluation and sends a result thereof to the CPU 41. The CPU 41 sends out a control signal to the stage drive device 44 based on the result of degree of focus evaluation operation and moves the stage 31 upward or downward, whereby a relative distance between the specimen S and the objective 36 is adjusted so as to enable autofocus.

The CPU 41 sends out as output a shutter open/close signal to the excitation light shutter drive circuit 45 when a necessity arises.

The external controller 46 is a device which comprises: switches and a jog dial for use in control of electrically driven units of the microscope by the operator and when the operator performs operations such as start and stop in autofocus action and the like using the external controller 46, the information is transmitted to the CPU 41 and thereby the CPU 41 can perform actions according to the operations by the operator.

The external controller 46 is equipped with a voice output unit such as a buzzer therein and for example, success/failure in autofocusing can be noticed to the operator by functioning the voice output unit.

Figure 7:
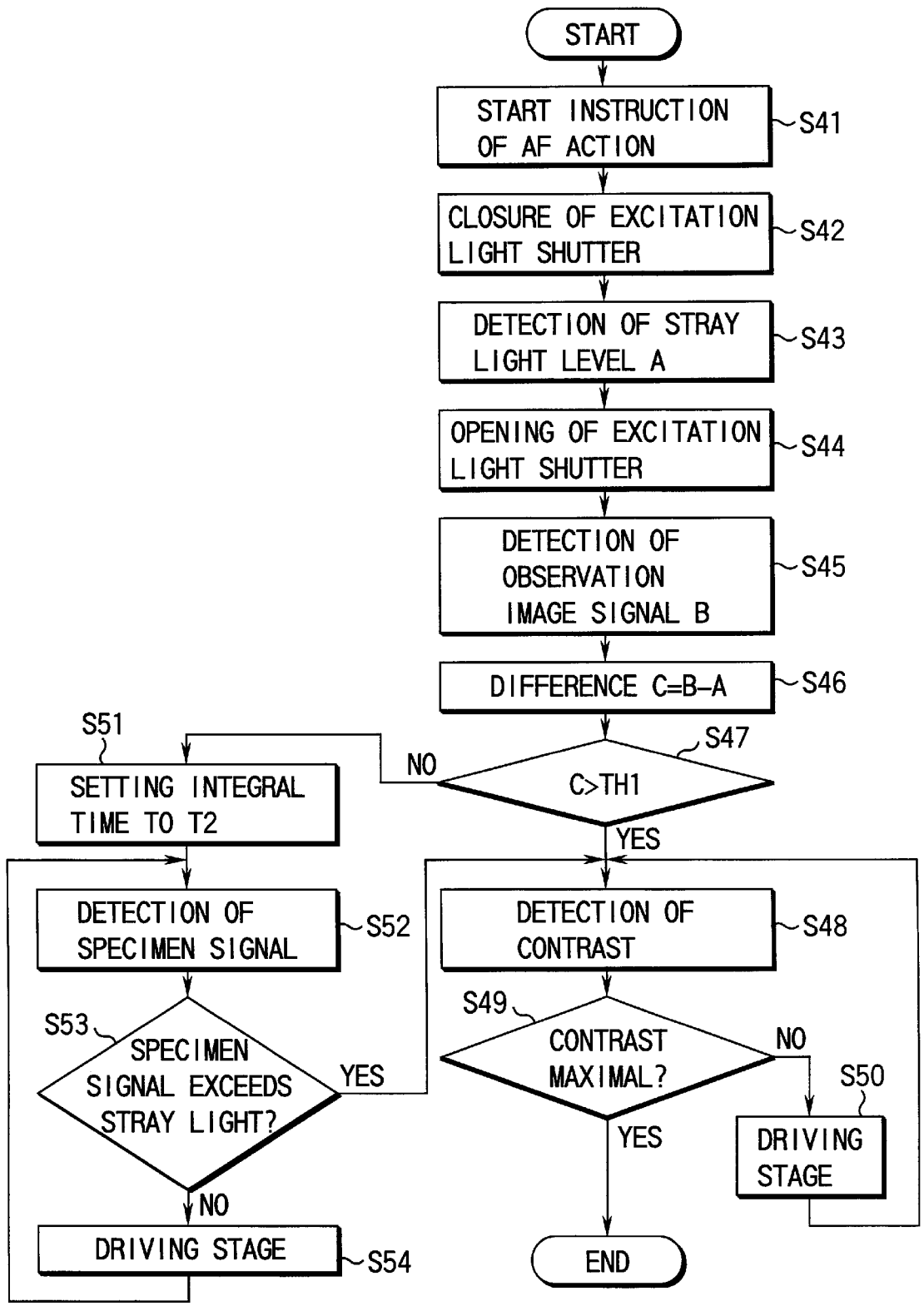
FIG. 7 is a flow chart for illustrating actions of the third embodiment.

Actions of this embodiment in preventing malfunction by stray light described above will be described with reference to a flow chart shown in FIG. 7.

When start of an autofocus action is instructed by operation on the operator (step S41), the excitation light shutter drive circuit 45 is driven to close the excitation light shutter 33 (step S42).

When the excitation light shutter 33 assumes a close state, a level A of stray light incident on the objective 36 and the eye pieces 37 is detected (step S 43), then the shutter 33 is opened (step S44) and an observation image signal B which includes the stray light is further detected (step S45).

A difference C between the stray light level A and the observation image signal B is obtained (step S46). Then it is determined whether or not an output of the difference C is equal to or larger than a specific value TH1 which has been determined in advance (step S47). In this determination, when the difference output C is equal to or larger than TH1 (YES), it is judged that the specimen is present in a close position and autofocus control is executed.

The autofocus control is performed in such a manner that a contrast of an observation image is detected (step S48) and a stage position at which the maximal contrast is attainable is further detected (step S49, S50) whereby the autofocus control is completed.

In determination of step S47, however, when the difference output C is less than the specific value TH1 (NO), it is judged that the specimen is not present in a close position, which is followed by specimen search.

This specimen search is performed while an integral time of the image sensor when stray light is detected is set to a shorter integral time T2 in the range of from a half to one fourth times the integral time T1 which was obtained when stray light was detected (step S51). In the search of the specimen, the stage is driven so that a specimen signal comes to show a level sufficiently higher than that of the stray light, that is a specimen signal comes to show a level sufficient higher than a stray light output A for the integral time T2 which is calculated from a relation between the stray light output A and the integral time T2 (steps S52 to S54). When this specimen search is completed, program flow goes to step S48 and there autofocus control is performed.

According to this embodiment, since only a level of stray light which is incident on the image sensor 39 is first detected at start of autofocus and thereafter, the level of the stray light can be eliminated from a specimen optical image including the stray light which is later detected, it is determined with certainty whether a search action for the specimen is necessary.

Besides, since an output of the stray light is already known in the search, an integral control action of the image sensor including the stray light is not required which can lead to a short integral time, whereby a focusing speed is improved due to shortening of a time requirement for the search.

In this embodiment, while detection of stray light is conducted using the excitation light shutter 33, similar effects can be obtained when an output of the excitation light source itself is reduced by the light source intensity control circuit 47 or when the shutter structure is positioned in the downward projection fluorescent tube.

In this embodiment, while an autofocus control of a so called hill climbing servo type in which the maximal contrast position of the observation image is detected is adopted, an autofocus control of an optical path difference type can also be adopted.

Then the fourth embodiment will be described.

Since the construction of this embodiment is equal to that of the third embodiment and only actions are different from those of the third embodiment, description on the construction is omitted, while setting of a scope of specimen search which is characteristic of this embodiment will be described.

In this fourth embodiment, a setting function of a specimen search scope is a function that, while an upper and lower limits of the scope of the stage in which the specimen is searched can be set from a thickness of a slide glass and a thickness of the specimen which the operator uses, the focal point detection device avoids performing specimen search over all the movable scope of the stage, whereby a focusing time is shortened.

Figure 8:
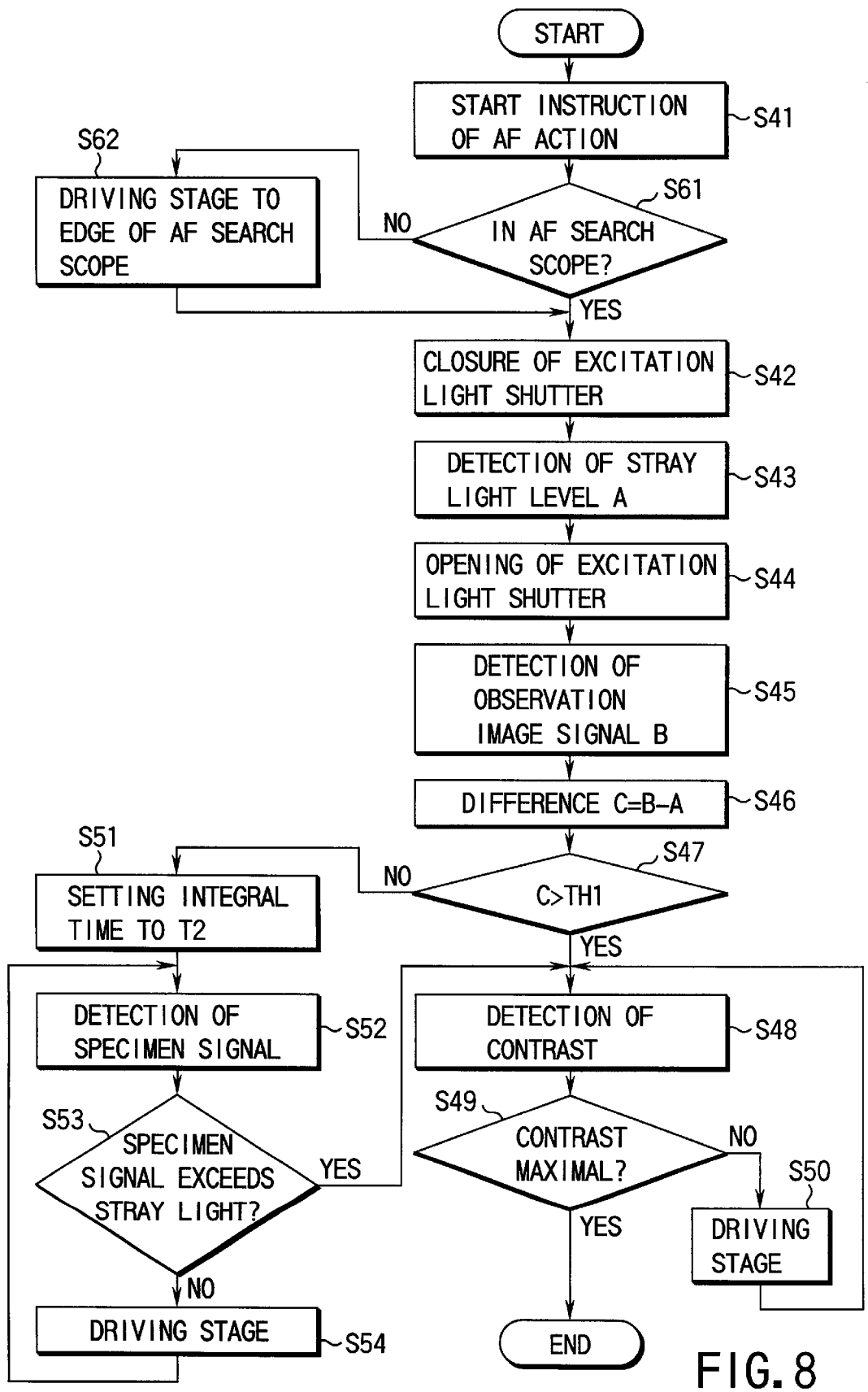
FIG. 8 is a flow chart for illustrating actions of an automatic focal point detection device for a microscope according to a fourth embodiment.

Actions of an automatic focal point detection device having such a function will be described with reference to a flow chart shown in FIG. 8. The steps having the same functions as those of the steps in the first embodiment are respectively indicated by the same step numbers.

First of all, when start of an autofocus action is instructed by operation of an operator (step S41), it is determined whether or not a stage position at which the stage 31 currently assumes in stop is a position in the scope of a predetermined specimen research (step S61).

When the stage position is in the specimen research scope in this determination (YES), program flow goes to step S42 and to the following steps as in the first embodiment and stray light is detected. However, when the stage position assumes a position outside the scope of specimen search (NO), the stage is moved to an edge of the specimen research scope (step S62). After the stage is moved to the edge of the research scope, program flow goes to step S42 and the excitation light shutter 33 is closed (step S42).

A stray light level A in a close state of the excitation light shutter 33 is detected, and then an observation image signal B is detected in an open state of the excitation light shutter 33, whereby a difference C between the stray light level A and the observation image signal B is obtained (steps S43 to S46). Then, the difference output C is compared with the specific value TH1. When the difference output C is equal to or larger than TH1, only autofocus control is effected (steps S48 to S50). However, when the difference output C is smaller than TH1 (NO), it is judged that the specimen is not present at a close position and after specimen search is performed (steps S51 to S54), autofocus control is effected (steps S48 to S50).

An effect of the fourth embodiment will be described using FIGS. 9A and 9B.

Figure 9A:
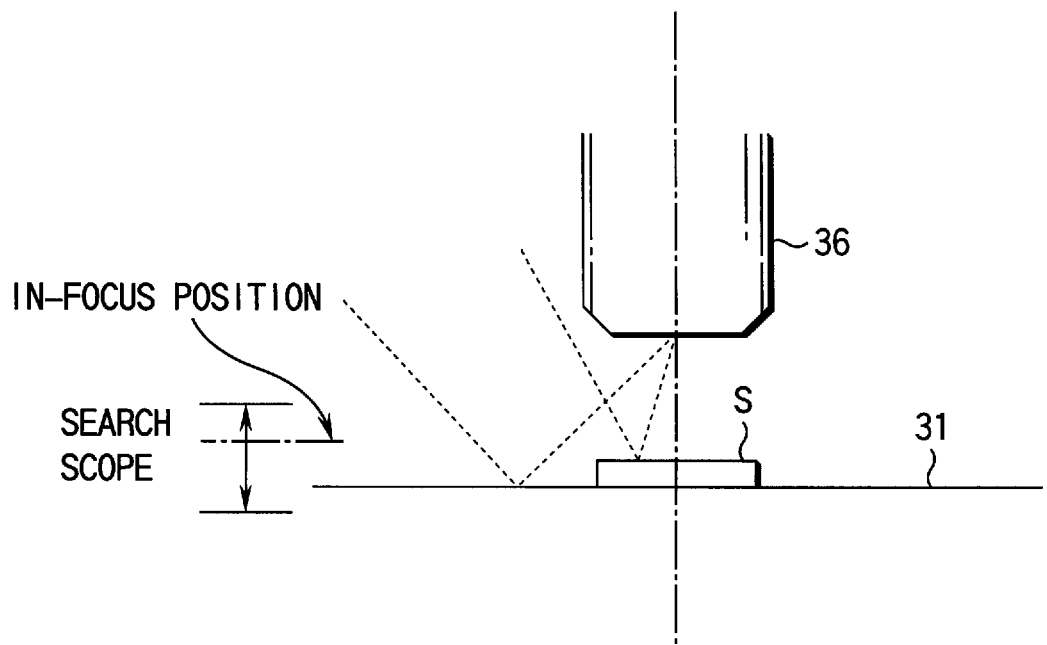
FIGS. 9A and 9B are representations for illustrating an effect of the fourth embodiment.

FIG. 9A is a representation showing stray light incident on the objective 16 when the stage 31 is present at a position in the search scope.

Since the stage position is in the search scope which has been set by the operator, it is almost close to a focal point.

Hence, the stray light output is almost not changed when the stage is present at a true focal point.

Figure 9B:
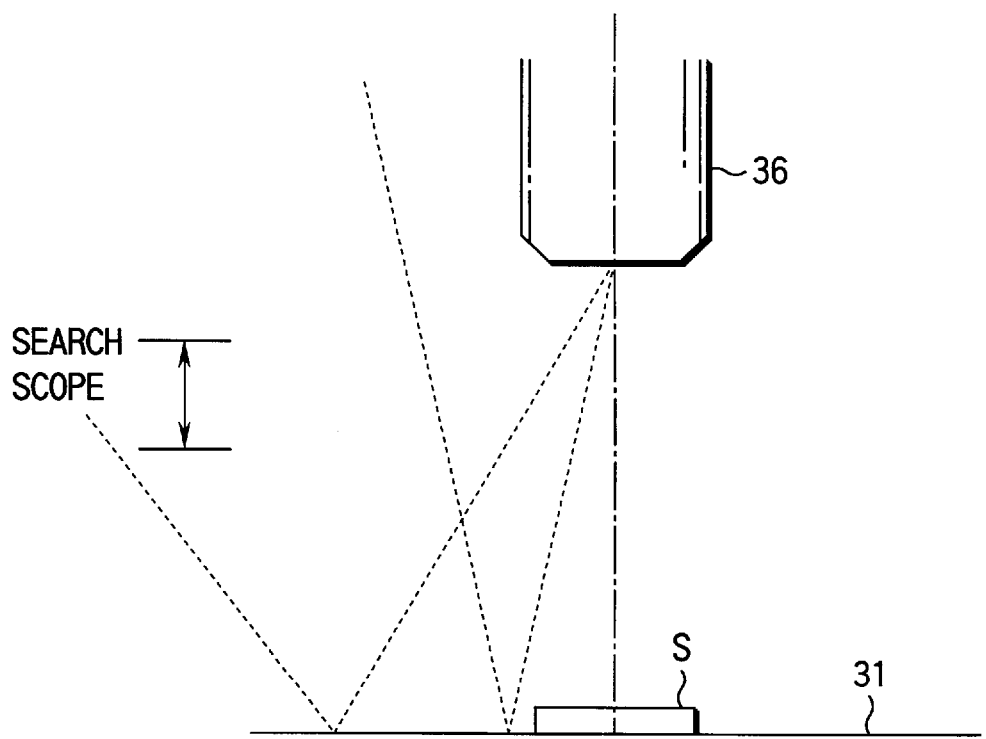

On the other hand, FIG. 9B shows stray light incident on the objective 36 when the stage is present outside the search scope.

When a relative distance between the objective 36 and the stage 31, or the objective 36 and the specimen S is long, since a length of an optical path of reflecting light which is irradiated from the stage 31 or the specimen S to the objective 36 is long, a power of the reflecting light is reduced and an amount of reflecting light from the stage 31 or the specimen S caused by room irradiation is eventually decreased.

That is, a stray light level measured when the stage or the specimen is present outside the search scope cannot be regarded as a stray light level when the specimen is present at a focal point. Accordingly, when stray light is detected, the detection is required when the stage is present at a position close to a focal point.

In this embodiment, in order to be sure to conduct detection of stray light, when autofocus is effected at a position of the stage outside the search scope, detection of stray light is controlled so as to be performed at an end of search scope.

Accordingly, with such a control employed, an automatic focal point detection device of this embodiment can detect stray light at any position of the stage and thereby autofocus control with a high speed and high accuracy can be realized.

Figure 10:
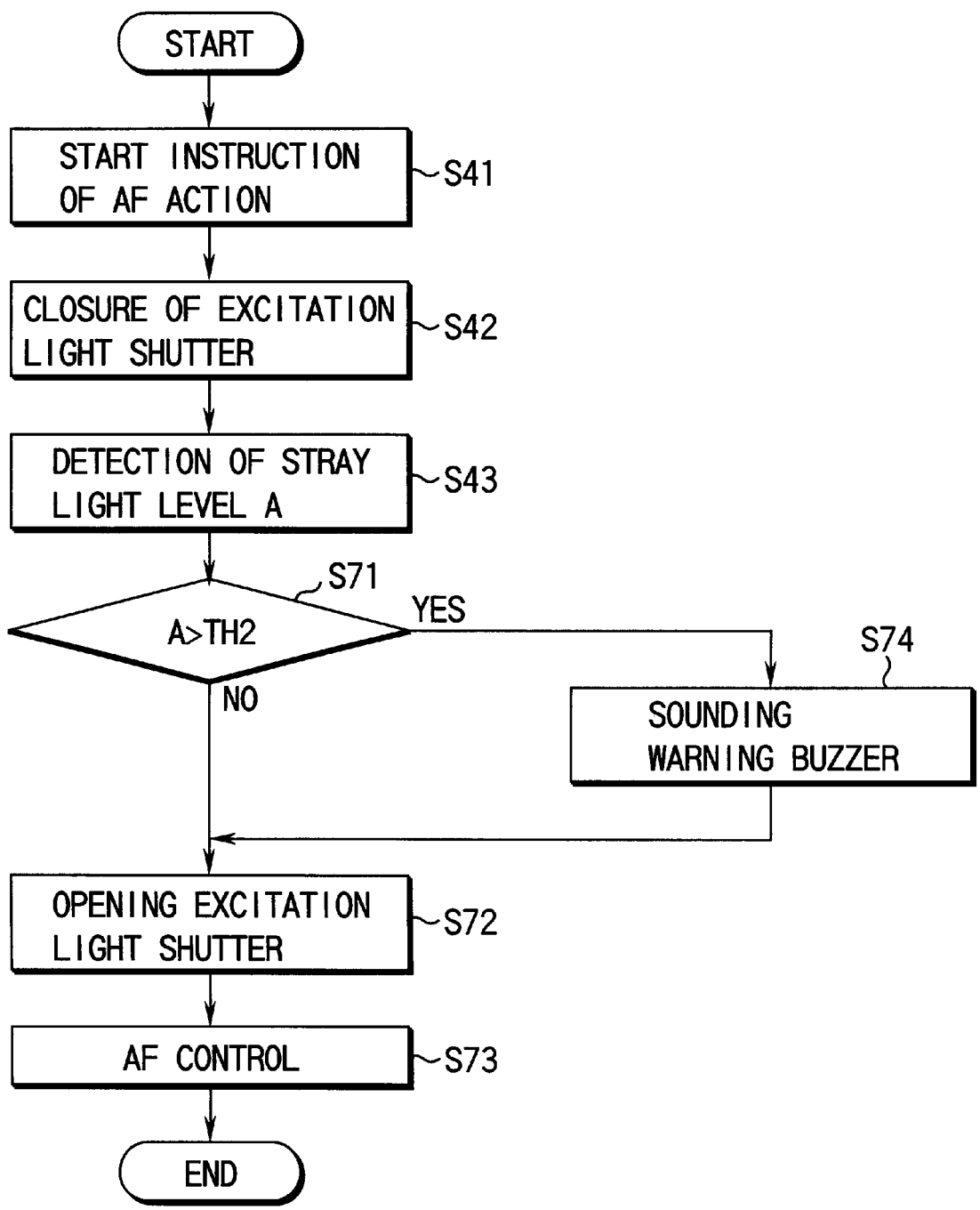
FIG. 10 is a flow chart for illustrating actions of the fifth embodiment.

Then, the fifth embodiment will be described with reference to a flow chart shown in FIG. 10.

Since the construction of this embodiment is similar to that of the third embodiment, description on the construction is omitted, while a warning action for stray light which is characteristic of this embodiment will be described. In this embodiment, too, the steps which have the same actions as those of steps of the third embodiment are attached by the same step numbers and detailed description on the steps is again omitted.

First of all, when start of autofocus action is instructed by operation of an operator (step S41), the excitement shutter 33 is closed (step S42). A stray light level A in a close state of the excitation light shutter 33 is detected (step S43).

Then, the stray light level A is compared with a specific value TH2 which has been determined in advance (step S71). As a result of the comparison, when the stray light level A is smaller, an autofocus action equal to the third or fourth embodiment is effected.

That is, the excitation light shutter 33 is opened (step S72), an observation image signal B is detected and a difference C between the stray level light A and the observation image signal B is obtained. The difference C is compared with the specific value TH1. When the difference output C is equal to or larger than TH1, only autofocus control is effected, while a difference output C is smaller than TH1, if is judged that the specimen is not present at a close position and after specimen search, autofocus control is effected (step S73).

However, when a stray light level A exceeds a specific value TH2 (YES) in the determination in step S71, a warning buzzer and the like which is built in the external controller 46 is driven (step S74) and an operator is noticed that stray light is too strong to keep autofocus accuracy at a reasonable level but autofocus accuracy has a risk to be reduced.

According to autofocus action in this embodiment, in order that the operator makes autofocus control acted in a normal way, measures such as darkening room irradiation can be taken by the operator, whereby an environment can be realized which is suitable for constantly performing autofocus control with a high speed and high accuracy.

In this embodiment, while as a method to give a warning to the operator, a warning is acoustically issued to the operator by a voice output unit, if a warning is visually issued using a light emitting unit such as LED, a similar effect can be obtained.

While an observation image is detected after stray light is detected when in the detection of a difference between the stray light and the observation image, if the procedures are conducted in a reversed manner, that is after the observation image is effected, then stray light is detected, a similar effect can be attained.

Besides, in this embodiment, while only fluorescence observation is especially described, since if the embodiment is applied to another examination with a microscope, for example to downward projection dark field observation, the construction of the optical system is the same, a similar effect can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An autofocus device for a microscope which is mounted on a microscope including:
    a stage, on which a specimen to be observed is placed, and which is three-dimensionally movable;
    an image forming optical section, which is provided with a plurality of objectives respectively having different magnifying powers in an interchangeable manner, and which forms an image with beams with which the specimen are irradiated through an selected objective;
    a focusing section for effecting focusing of the objective, including movement, upward and downward, on the formed optical image;
    an image pick-up section for shooting an in-focus optical image which is brought to be in focus by the focusing section;
    an image display section for displaying a shot optical image by the image pick-up section;
    an image splitting section for splitting the entire image of the specimen into an arbitrary number of small areal images; and
    an image processing section for integrating the small areal images obtained by the splitting and reconstructing the entire image of the specimen, the autofocus device comprising:
        an in-focus position storage section for storing an in-focus position as three-dimensional data of the specimen which is brought to be in-focus for the first time composed of a position of a stage along the optical axis of the selected objective and a position of the optical axis in a plane of the stage which is perpendicular to the optical axis; and
        a focusing control section for moving the stage, reading an in-focus position which is stored in the in-focus position storage section, if an in-focus position cannot be obtained when focusing is performed on the small areal images by the focusing section in image shooting by the image pick-up section.

2. An autofocus device for a microscope according to claim 1, wherein the in-focus position storage section sequentially stores in-focus positions as three-dimensional data of the specimen which is brought to be in focus each composed of a position of a stage along the optical axis of the selected objective and a position of the optical axis in a plane of the stage which is perpendicular to the optical axis, while replacing the latest in-focus position as three-dimensional data of the specimen which has been stored in the focus position storage section with an in-focus position as three-dimensional data of the specimen to be newly stored therein.

3. A microscope on which an autofocus device for a microscope according to claim 1 is mounted displays the small areal images of the specimen which have been shot by the image pick-up section and the entire image of the specimen which has been reconstructed from the small areal images, selectively and/or at the same time, on the image display section.

4. An autofocus device for a microscope according to claim 1, wherein an in-focus position in a small areal image obtained by the splitting the specimen in the image splitting section at any of a central position of the specimen; a position on the specimen at which the maximal difference of contrast level of a specimen optical image is obtained; and/or a position on the specimen which is arbitrarily designated is stored as an in-focus position at which a focus has been achieved for the first time by the focusing section.

5. An autofocus device for a microscope according to claim 1 comprises table information in which the plural number of small areal images which are obtained by splitting the entire image of the specimen in the image splitting section is determined in advance by a magnifying power of a first objective for shooting the small areal images which are obtained by the splitting of the specimen in the image splitting section and a magnifying power of a second objective for shooting the entire specimen in one visual field.

6. An autofocus device for a microscope according to claim 1, wherein the focusing control section controls drive of the focusing section, reading an in-focus position which has been stored in the in-focus position storage section with judgment that focusing cannot be executed, when no optical image of the specimen is available in a small areal image or a contrast of an optical image is low in a small areal image, whereby a contrast level which is detected is lower than a setting value which has been determined in advance.

7. An automatic focal point detection device for a microscope which is mounted on a microscope provided with a light source emitting excitation light with which a specimen is irradiated, comprising:
    a shutter section for intercepting the excitation light with which a specimen is irradiated; and
    a detection section for converting an observation image of the microscope to electric signal,
    wherein focusing is executed when a difference between a stray light level in a light interception state and an observation image level in an irradiation state obtained by the detection section is equal to or higher than a threshold value set in advance, while, when the difference is lower than the threshold value, focusing is executed after specimen search is conducted using the stray light level as a reference.

8. An automatic focal point detection device which is mounted on a microscope including:
    a stage which is three-dimensionally movable while holding a specimen thereon;
    an image forming optical section, which is movable, upward and downward, and which is provided with a plurality of objectives respectively having different magnifying powers in an interchangeable manner, and which forms an image with beams with which the specimen are irradiated through an selected objective;

a focusing section for moving the stage to an in-focus position of the specimen while adjusting a relative distance between the objective lens and the stage;

an excitation light source for emitting excitation light with which a specimen is irradiated:

an integrating image sensor for converting an optical image from the image forming optical section to an electric signal;

an arithmetic unit for operating a degree of focus on the specimen according to an output from the integrating image sensor; and an focusing control section for controlling a stage position so as to guide the specimen to an in-focus position, the automatic focal point detection device comprising:

an excitation light shutter for intercepting irradiation of the specimen with the excitation light;

a stray light output section for obtaining an output of the integrating image sensor in a close state of the excitation light shutter; and a stray light difference output section for calculating a difference between an output of the integrating image sensor in an open state of the excitation light shutter and an output of the stray light detection section, wherein the focusing section is driven for focusing by the focusing control section based on information on a degree of focus on the specimen obtained by the arithmetic section and information on a stray light difference from the stray light difference output section.

9. An automatic focal point detection device according to claim 8, wherein the focusing control section compares a reference level which has been determined in advance with a difference output from the stray light difference output section, and when the difference output is larger, focusing is executed, while the difference is smaller, focusing is executed after an integral time of the integrating image sensor is set to a value set in advance according to kinds of the objectives, then the stage is moved to a position where the difference output exceeds the stray light signal level and the integral time is restored to its original value.

10. An automatic focal point detection device according to claim 9, further comprising:

a search scope setting section which can set a scope of specimen search in advance; and a high speed stage movement section for moving the stage to an edge of the search scope at a high speed when autofocusing is activated at a point outside the search scope set by the search scope setting means, wherein control actions by the stray light output section, the stray light difference output section and the autofocus control change section are performed after the stage arrives at the edge of the search scope set in advance by the high speed stage movement section.

* * * * *